US008626364B2

(12) United States Patent
Moresve

(10) Patent No.: US 8,626,364 B2
(45) Date of Patent: Jan. 7, 2014

(54) METHOD AND SYSTEM FOR CONTROLLING THE AUTOMATIC LANDING/TAKE-OFF OF A DRONE ON OR FROM A CIRCULAR LANDING GRID OF A PLATFORM, IN PARTICULAR A NAVAL PLATFORM

(75) Inventor: Julien Pierre Guillaume Moresve, Le Relecq-Kerhuon (FR)

(73) Assignee: DCNS, Paris (FR)

( * ) Notice: Subject to any disclaimer, the term of this patent is extended or adjusted under 35 U.S.C. 154(b) by 469 days.

(21) Appl. No.: 13/123,616

(22) PCT Filed: Oct. 13, 2009

(86) PCT No.: PCT/FR2009/051948
§ 371 (c)(1),
(2), (4) Date: Apr. 11, 2011

(87) PCT Pub. No.: WO2010/043812
PCT Pub. Date: Apr. 22, 2010

(65) Prior Publication Data
US 2011/0202209 A1    Aug. 18, 2011

(30) Foreign Application Priority Data
Oct. 13, 2008 (FR) ..................................... 08 56927

(51) Int. Cl.
*G06F 19/00* (2011.01)
(52) U.S. Cl.
USPC ...................... 701/15; 701/16; 701/17; 701/3
(58) Field of Classification Search
USPC ........... 701/15, 16, 3; 342/36, 42, 47; 440/33; 244/190, 3.14
See application file for complete search history.

(56) References Cited

U.S. PATENT DOCUMENTS

| 5,521,817 | A  | * | 5/1996 | Burdoin et al. | .................... | 701/3 |
| 8,265,808 | B2 | * | 9/2012 | Garrec et al. | .................... | 701/16 |
| 2005/0033489 | A1 | | 2/2005 | Tezuka | | |
| 2005/0124234 | A1 | * | 6/2005 | Sells et al. | ..................... | 440/33 |
| 2009/0055038 | A1 | * | 2/2009 | Garrec et al. | .................... | 701/17 |
| 2009/0243911 | A1 | * | 10/2009 | Cornic et al. | .................... | 342/36 |

FOREIGN PATENT DOCUMENTS

FR    2 727 082    5/1996

\* cited by examiner

*Primary Examiner* — Behrang Badii
(74) *Attorney, Agent, or Firm* — Jacobson Holman, PLLC

(57) ABSTRACT

The invention relates to method characterized in that said method comprises steps of acquiring movements, calculating the mean position, calculating position predictions, and calculating minimum grid (5) movement speeds, and a step of acquiring the position of the drone (4) so that, if the drone cannot follow the movements of the grid and the movements of the grid are small, i.e. smaller than the radius of the latter, it is possible to apply a landing strategy by monitoring the mean position of the grid, and if the movements of the grid are large, i.e. larger than the radius of the grid, it is possible to apply a landing strategy by positioning at the minimum speeds of the grid, and if the drone (4) can follow the movements of the grid (5) and the movements of the grid are small, i.e. smaller than the radius of the grid, it is possible to apply a landing strategy according to the mean position of the grid, and if the movements of the grid are large, i.e. larger than the radius of the grid, it is possible to apply a landing strategy by following the position of the grid predicted at the instant of landing.

6 Claims, 6 Drawing Sheets

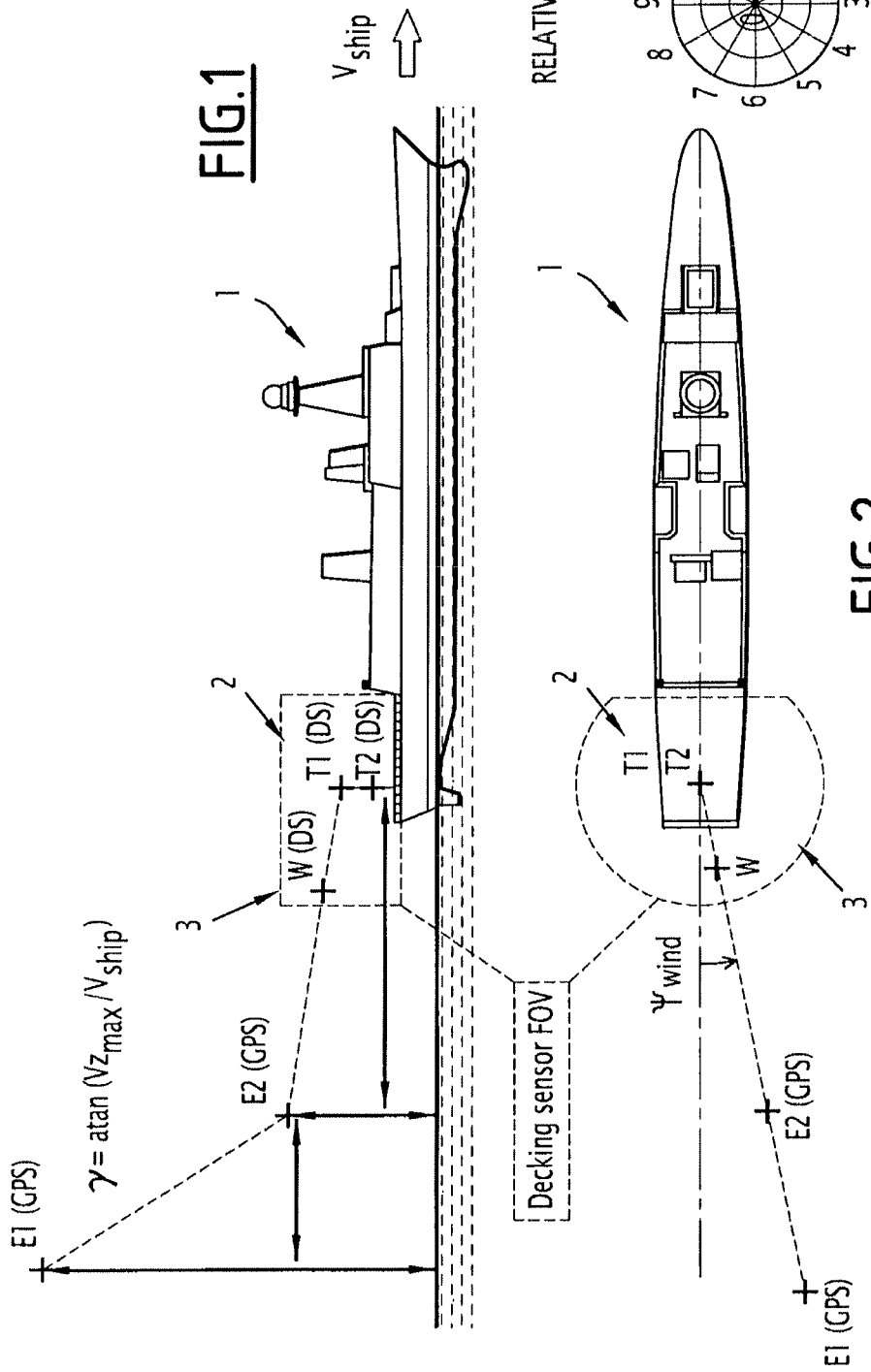

Figure 3:
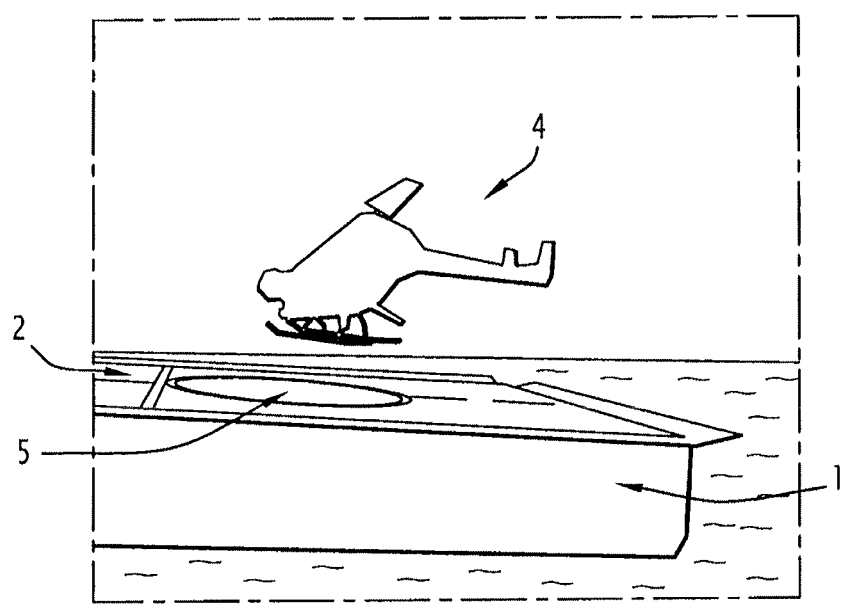

METHOD AND SYSTEM FOR CONTROLLING THE AUTOMATIC LANDING/TAKE-OFF OF A DRONE ON OR FROM A CIRCULAR LANDING GRID OF A PLATFORM, IN PARTICULAR A NAVAL PLATFORM

This is a 371 of PCT/FR09/051948 filed Oct. 13, 2009, which claims the priority of French number 0856927 filed Oct. 13, 2008, hereby incorporated by reference.

The present invention relates to a method and a system for controlling the automatic decking/take-off of a drone on or from a circular decking grid of a platform, in particular a naval platform.

It is known that the problem of controlling the decking/take-off of a drone on a platform, in particular a naval platform, has been an issue already for a number of years.

In particular, such control must be provided, for example, in heavy seas on a naval platform of small size, of corvette type, for example, and such control must be provided regardless of the size of the drone, which may also be of small size and whose movements are then at high frequency.

Automatic control methods of this type, which implement, for example, laser, GPS, optical or other means, have already been proposed in the state of the art.

These various means then make it possible to initiate a decking of the drone according to landing strategies which also vary according to various proposals in the state of the art.

Thus, for example, one landing strategy that has already been proposed consists in permanently servo-controlling the position of the drone relative to the deck of the platform.

Other landing strategies consist in predicting a particular position of the deck such as, for example, a wave top, in order to initiate the decking.

Other strategies also consist in initiating the landing at minimum displacement speeds of the deck.

However, none of the solutions hitherto proposed has given full satisfaction, particularly in heavy seas.

The purpose of the invention is therefore to resolve these problems.

To this end, the subject of the invention is a method for controlling the automatic decking/take-off of a drone on or from a circular decking grid of a naval platform, characterized in that it comprises the following steps:
a step for acquiring the movements of the grid,
a step for calculating the mean position of the grid,
a step for calculating grid position predictions,
a step for calculating minimum displacement speeds of the grid, and
a step for acquiring the position of the drone in order:
if the drone cannot follow the movements of the grid and if the movements of the grid are small, that is to say less than the radius of said grid, to apply a landing strategy by following the mean position of the grid, whereas, if the movements of the grid are large, that is to say greater than the radius of the grid, to apply a landing strategy by positioning at the minimum speeds of the grid; and
if the drone can follow the movements of the grid and if the movements of the grid are small, that is to say less than the radius of the grid, to apply a landing strategy according to the mean position of the grid, and if the movements of the grid are large, that is to say greater than the radius of the grid, to apply a landing strategy by following the grid position predicted at the moment of decking.

According to other aspects of the invention, the method and the system for controlling the automatic decking/take-off of a drone comprises one of the following characteristics:

it comprises a step for controlling the dynamic speed and attitude conditions of the platform and of the drone, a step for checking that the drone is indeed vertical to the grid and a step for checking that the position of the grid predicted when said grid has finished its descent is indeed situated under the drone, to deliver the decking order to the drone, it comprises, before the actual decking phase, a meeting phase between the drone and the platform at a predetermined geographic point behind the platform, followed by an approach phase during which the approach trajectory is globally oriented according to the mean displacement heading of the platform to perform an approach from the rear of the latter, it comprises a step for checking attitude conditions of the platform, before giving the take-off order to the drone, and the step for controlling the attitude conditions consists in calculating roll and pitch predictions for the platform and in checking that these roll and pitch predictions for the platform, during the time necessary for take-off, are within predetermined limit thresholds.

According to another aspect, another subject of the invention is a system for implementing this method.

Figure 4:
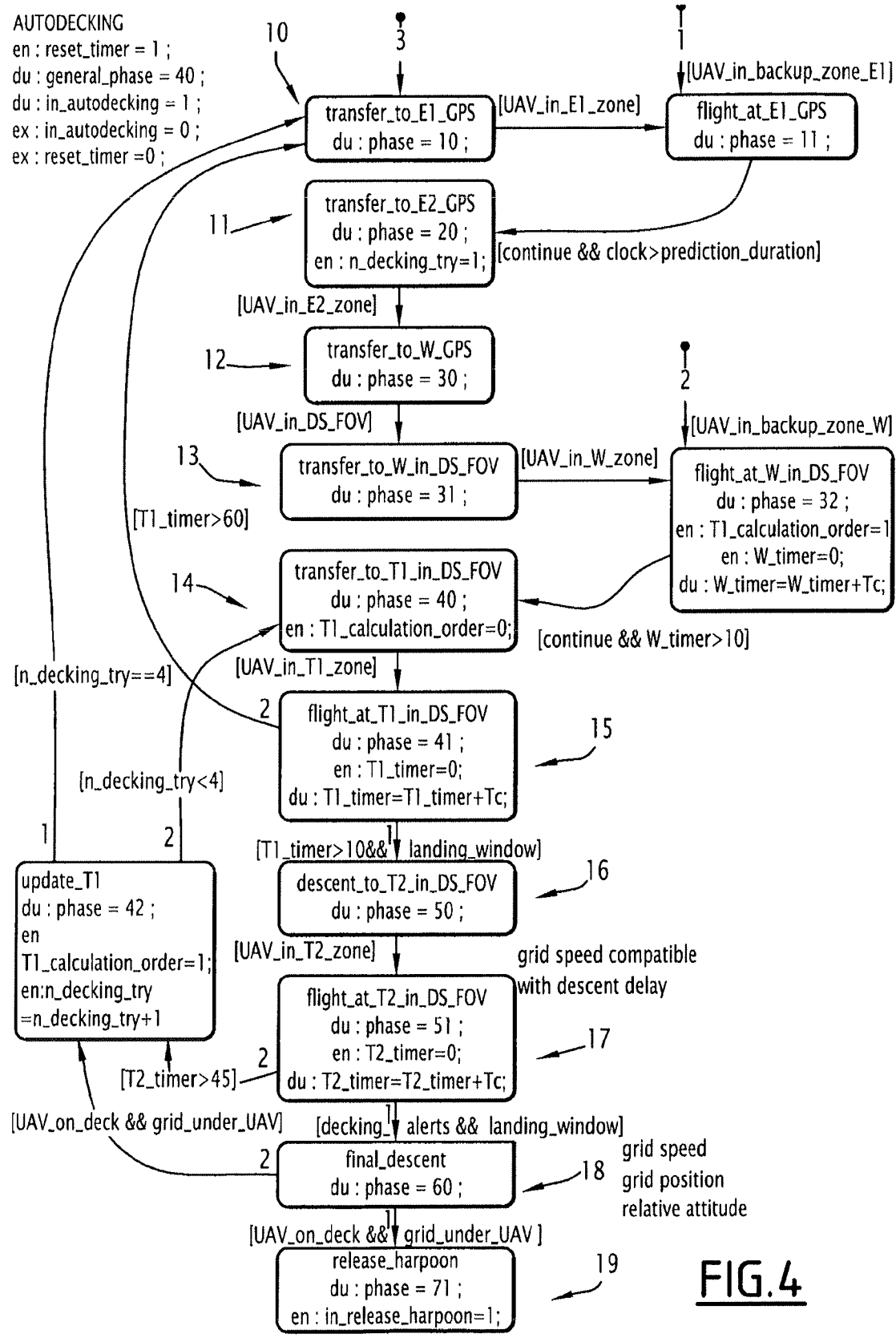
Figure 5:
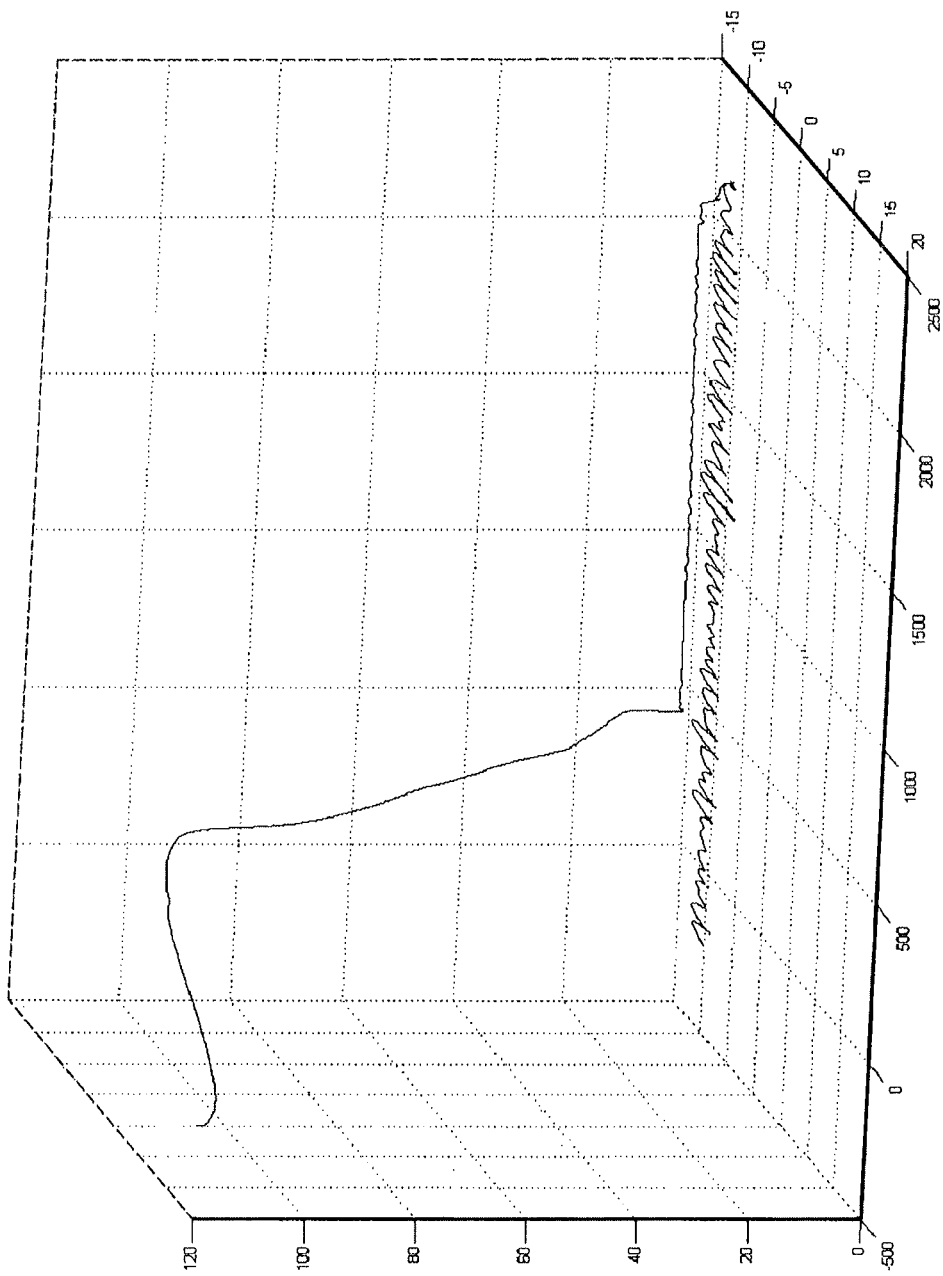
Figure 6:
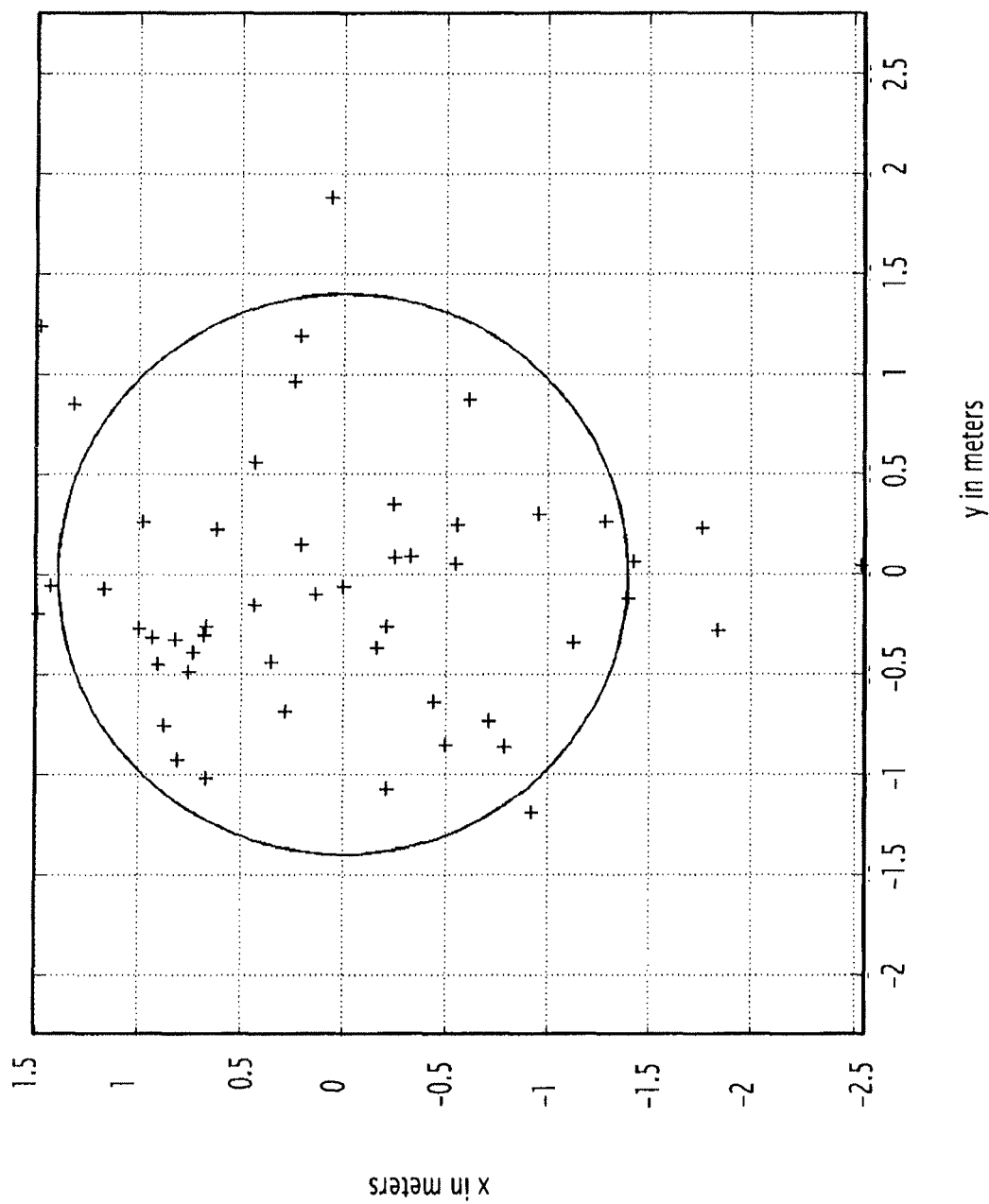
Figure 7:
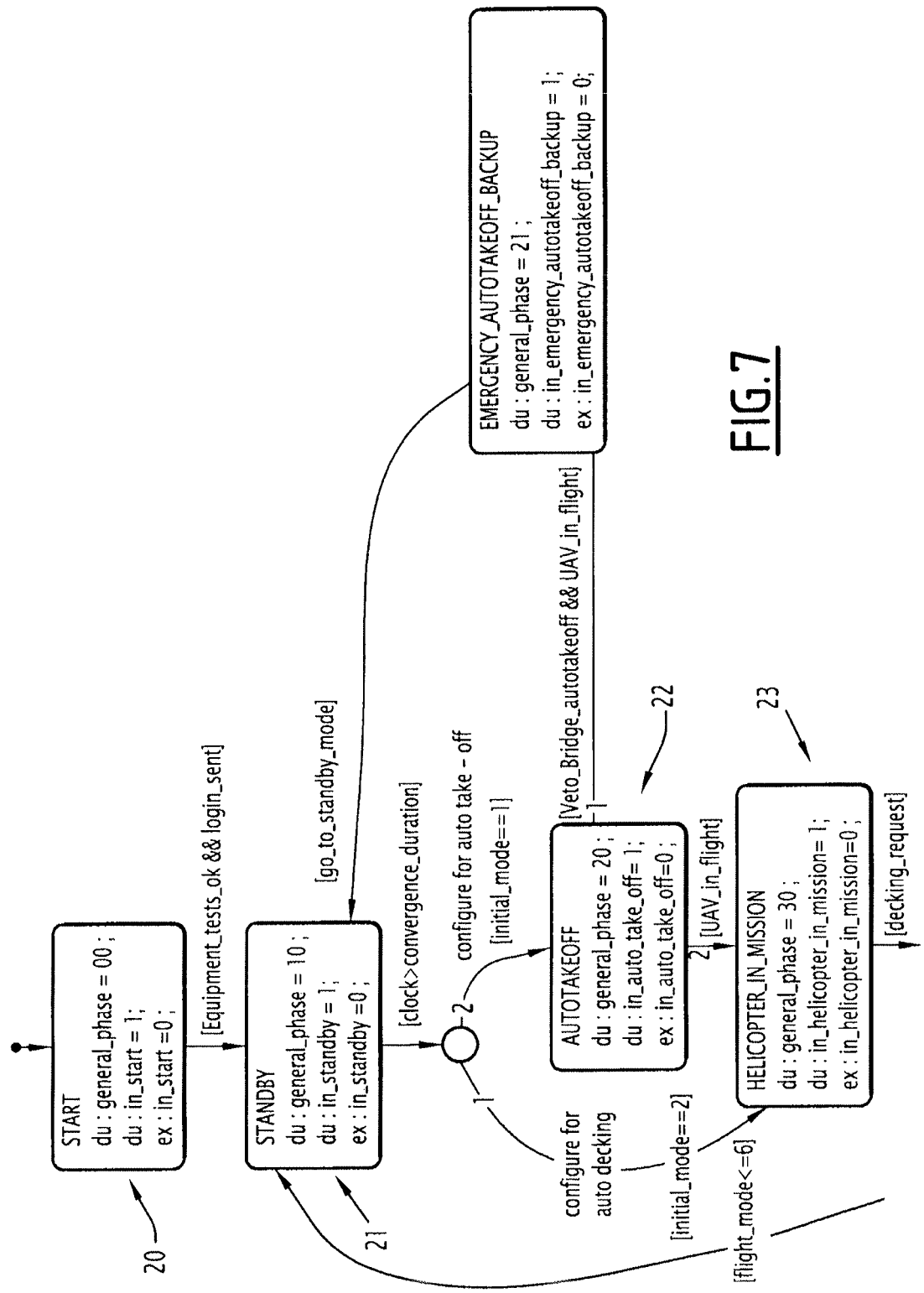

The invention will be better understood from the following description given solely as an example and with reference to the appended drawings in which:

FIGS. 1 and 2 represent side and plan views of a naval platform and the approach trajectory of a drone, FIG. 3 illustrates the decking of such a drone, FIG. 4 is a status diagram of an automatic decking method according to the invention, FIGS. 5 and 6 illustrate decking impact simulations obtained by the implementation of a control method according to the invention, and FIG. 7 is a status diagram of an automatic take-off method according to the invention.

FIGS. 1, 2 and 3 illustrate a method for controlling the automatic decking of a drone on a circular decking grid of a naval platform.

This platform is, for example, designated by the general reference 1 in these figures and therefore comprises a decking zone designated by the general reference 2, provided with a grid suitable for receiving, for example, a harpoon for keeping the drone in position when the latter has landed, in a conventional manner.

As it happens, the control method according to the invention consists in bringing the drone into a field close to the platform by virtue of the geolocation information for that platform, then in automatically piloting the drone speed-wise, relative to this platform, by virtue of a high-frequency motion sensor of the optical decking sensor type for example, in order to bring it to land in total safety on the decking grid of the platform.

To this end, the position and speed measurements of the platform are processed to create an approach trajectory for the drone, then the platform/drone position angle error measurements hybridized with the inertial measurements of the platform are processed to create a final decking trajectory for the drone.

The calculated trajectory is similar to that for the decking of a helicopter in order to establish a steady air circulation speed around the superstructures of the platform and guarantee the stability of the flight, but also so that the visual safety controls are identical to those for helicopters for the aviation officer.

It is therefore not solely about an ongoing servo-controlling of the position of the drone relative to the deck of the platform, but indeed about positioning the drone at a particular point above the general movement of the deck then waiting for the position, speed and attitude conditions to be met.

Nor is it solely about predicting a wave top for decking.

In practice, the short-term prediction of the positions and the attitudes of the deck only makes it possible to check that the conditions will still be met on touch-down, the hardening of the landing gear of the drone making it possible to withstand the corresponding speeds.

Furthermore, the relative distance of the two craft, that is to say of the platform and of the drone, during the critical landing phase, is monitored by a non-GPS technology, optical for example, and therefore permanently available and reliable.

In practice, the recovery of the drone is divided into three general phases illustrated in these FIGS. 1, 2 and 3.

These phases are meeting, approach and landing.

The meeting of the drone with the platform is a phase for positioning the drone over a fixed point, for example a GPS point, of geographic fix NED (North East Down).

This point is placed at safety altitude toward the rear of the platform at the estimated meeting time. This point is designated E1 in FIGS. 1 and 2.

The approach is a sequence which enables the drone to enter the deck in the relative wind direction.

The mean geolocation information for the platform is used to define a setpoint approach trajectory for the drone, by alignment of the two craft from the point E1.

The approach trajectory is globally oriented according to the mean heading of the platform in order to make an approach from the rear of this platform facing the helicopter hanger of the latter, for example.

Then, the trajectory of the drone is finely oriented toward the infinite wind backward of the platform if it is within the wind limits allowed for the drone/platform pairing. If it is not, the wind contract is not fulfilled by the aviation command bridge of the platform and the route of the ship must change in order to observe these wind limits.

This approach trajectory passes through a point E2 illustrated in these FIGS. 1 and 2, the drone converging with the platform in distance and in altitude.

With the drone continuing its approach to the platform, it enters into the field of view of optical angle error measuring means located on the platform, this field of view being designated by the general reference 3 in these FIGS. 1 and 2.

The phase of precise piloting of the drone for its decking then begins.

The drone then, under the control of the means forming the angle error measuring sensor, sequences position setpoints W, T1 and T2 with waiting phases planned at each of these points, to check whether the dynamic conditions for the decking are met, and in particular the relative speeds and the attitude angles between the deck and the drone.

The landing strategy that is implemented will then depend on the movements of the platform and the dynamics of the drone.

Thus, if the drone cannot follow the movements of the grid and if the movements of the grid are small, that is to say less than the radius of said grid, there will then be applied a landing strategy based on following the mean position of the grid, whereas, if the movements of the grid are large, that is to say greater than the radius of the grid, there will then be applied a landing strategy based on positioning at the minimum speeds of the grid.

If the drone can follow the movements of the grid and if the movements of the grid are small, that is to say less than the radius of the grid, there will be applied a landing strategy according to the mean position of the grid and if the movements of the grid are large, that is to say greater than the radius of the grid, there will be applied a landing strategy based on following the grid position predicted at the moment of decking.

The vertical descent order is given when the drone is at T2 and the following conditions are simultaneously satisfied:

1) The dynamic speed and attitude conditions are met, these mainly depending on the resistance of the landing gear and the height of the center of gravity of the drone.

2) The drone is measured vertical to the grid by the means forming the optical angle error measuring sensor.

3) The position of the grid is predicted under the drone when it will have finished its vertical descent, that is to say, for example, in less than 5 seconds.

To observe the movements of the grid and determine the landing strategy, the principle of extracting the movements of the grid within the mean pseudo-inertial fix of the platform is used, and the short-term prediction of the position of the grid uses conventional signal processing techniques to statistically identify the behavior of a physical system by using a technique for estimating the coefficients of an only just stable oscillating filter, to predict the position of the grid in a pseudo-inertial fix going at the speed of the platform.

The numerical conditioning of the coefficients of the filter is determinant and, given the random components of the movement of the platform, these techniques allow for a reliable prediction over a few seconds, which is enough to confirm that the decking will be performed correctly.

All these means are already well known from the state of the art and will not therefore be described in more detail hereinbelow.

As is illustrated in FIG. 3, this makes it possible to bring the drone, designated by the general reference 4 in this figure, above the deck of the platform 1 and in particular above the decking grid 5 of the latter.

Once landed, a means for securing the drone on the deck may be activated, such as, for example, a harpoon in the decking grid.

This is illustrated, for example, in FIG. 4, where it can be seen that the different orders sent to the drone and more particularly to its automatic piloting means, order it in 10 to position itself at the point E1, in 11 to position itself at the point E2, in 12 to position itself at the point W, where the control of its position switches from the GPS system to the optical angle error measuring sensor in 13.

The drone then moves to T1 as is illustrated in 14 then, after a waiting phase in 15, descends to T2 in 16 and, after a waiting phase in 17, lands on the deck in 18, before initiating the securing means such as, for example, the harpoon in 19.

FIGS. 5 and 6 illustrate decking trajectory and impact simulations, in the form of a Monte Carlo-type simulation sweep, of 50 deckings in force 5 sea conditions with a swell of 165(15° forward).

These figures show that, out of 50 decking simulations, 39 were successful at the first attempt.

Eleven deckings are alongside the grid on first landing and in this case the drone is required to take off again and reattempt a decking.

Full-scale tests have started and have confirmed the reliability of this control method.

Similarly, the method according to the invention also comprises a step for checking attitude conditions of the platform before giving the take-off order to the drone.

This control step consists in calculating roll and pitch predictions for the platform and in checking that these roll and pitch predictions, during the time required for the take-off, are within predetermined limit thresholds as is illustrated in FIG. 7, or after a start-up step illustrated in 20, the drone is placed on standby in 21 before initiating in 22 its automatic take-off, after which the drone is considered to be in mission in 23.

Thus, the automatic take-off is conditioned by the attitude conditions of the platform at the moment of the take-off, so as to avoid having the drone take off at too great an angle and assume an unexpected horizontal speed.

The principle of the take-off then involves rendezvousing with the point E1 after the take-off order, bearing in mind that the take-off order is launched only after a continuous prediction of the roll and pitch attitudes of the platform within the authorized thresholds during the time required for the take-off.

The system for implementing this method then comprises a certain number of means for acquiring data such as, for example, movements of the grid, and for calculating, such as, for example, the mean position of this grid or else for predicting grid positions and minimum displacement speeds of the latter.

It also comprises means for acquiring the position of the drone and means for transmitting command orders to the drone and more specifically to the automatic piloting means thereof in order to make it deck and/or take off in total safety.

Since these means based on data acquisition inertial units, GPS systems, optical or otherwise, have conventional structures, they will not be described in more detail hereinbelow.

As it happens, these means may have any appropriate structures incorporating computer programs in order to implement the various steps described previously.

The invention claimed is:

1. A method for controlling the automatic decking/take-off of a drone (4) on or from a circular decking grid (5) of a naval platform (1), characterized in that it comprises the following steps:
   a step for acquiring the movements of the grid (5),
   a step for calculating the mean position of the grid (5),
   a step for calculating grid position predictions (5),
   a step for calculating minimum displacement speeds of the grid (5), and
   a step for acquiring the position of the drone (4) in order:
   if the drone (4) cannot follow the movements of the grid (5) and if the movements of the grid (5) are small, that is to say less than the radius of said grid, to apply a landing strategy by following the mean position of the grid, whereas, if the movements of the grid are large, that is to say greater than the radius of the grid, to apply a landing strategy by positioning at the minimum speeds of the grid; and
   if the drone (4) can follow the movements of the grid and if the movements of the grid (5) are small, that is to say less than the radius of the grid (5), to apply a landing strategy according to the mean position of the grid, and if the movements of the grid are large, that is to say greater than the radius of the grid, to apply a landing strategy by following the grid position predicted at the moment of decking.

2. The method for controlling the automatic decking/take-off of a drone as claimed in claim 1, characterized in that it comprises a step for controlling the dynamic speed and attitude conditions of the platform (1) and of the drone (4), a step for checking that the drone (4) is indeed vertical to the grid (5) and a step for checking that the position of the grid (5) predicted when said grid has finished its descent is indeed situated under the drone, to deliver the decking order to the drone.

3. The method for controlling the automatic decking/take-off of a drone as claimed in claim 1, characterized in that it comprises, before the actual decking phase, a meeting phase between the drone (4) and the platform (1) at a predetermined geographic point behind the platform, followed by an approach phase during which the approach trajectory is globally oriented according to the mean displacement heading of the platform to perform an approach from the rear of the latter.

4. The method for controlling the automatic decking/take-off of a drone as claimed in claim 1, characterized in that it comprises a step for checking attitude conditions of the platform (1), before giving the take-off order to the drone (4).

5. The method for controlling the automatic decking/take-off of a drone as claimed in claim 4, characterized in that the step for controlling the attitude conditions consists in calculating roll and pitch predictions for the platform (1) and in checking that these roll and pitch predictions for the platform, during the time necessary for the drone (4) to take off, are within predetermined limit thresholds.

6. A system for controlling the automatic decking/take-off of a drone (4) on or from a circular decking grid (5) of a naval platform (1), characterized in that it comprises means for acquiring the movements of the grid (5), means for calculating the mean position of the grid (5), means for calculating position predictions for the grid (5), means for calculating minimum displacement speeds of the grid (5), means for acquiring the position of the drone and means for checking attitude conditions of the platform, in order to implement the method as claimed in claim 1.

\* \* \* \* \*